April 14, 1970 J. L. KELLY 3,506,274

PHONOGRAPH SPINDLE ADAPTOR

Original Filed July 24, 1964 3 Sheets-Sheet 1

INVENTOR:
JACK L. KELLY,

BY Thomas A. Briody
HIS ATTORNEY.

April 14, 1970 — J. L. KELLY — 3,506,274

PHONOGRAPH SPINDLE ADAPTOR

Original Filed July 24, 1964 — 3 Sheets-Sheet 2

INVENTOR:
JACK L. KELLY,

BY Thomas A. Briody
HIS ATTORNEY

PHONOGRAPH SPINDLE ADAPTOR

Original Filed July 24, 1964

3 Sheets-Sheet 3

INVENTOR:
JACK L. KELLY,

BY Thomas A. Brody
HIS ATTORNEY.

United States Patent Office 3,506,274
Patented Apr. 14, 1970

3,506,274
PHONOGRAPH SPINDLE ADAPTOR

Jack L. Kelly, Decatur, Ill., assignor to General Electric Company, a corporation of New York Continuation of application Ser. No. 384,953, July 24, 1964. This application Dec. 12, 1967, Ser. No. 701,024
Int. Cl. G11b *17/18*
U.S. Cl. 274—10 7 Claims

ABSTRACT OF THE DISCLOSURE

For use in a phonograph record playing mechanism, a subtantially one-piece molded adaptor which cooperates with a conventional phonograph spindle in such a way that it readily and removably adapts the spindle for operation with 45 r.p.m. records. This adapter also includes an integral structure which helps to preclude the inadvertent concurrent droppage of two or more 45 r.p.m. records onto the turntable.

The present application is a continuation of my copending application Ser. No. 384,953, filed July 24, 1964, for "Improved Photograph Spindle Adaptor," now abandoned.

The present invention relates to new and useful improvements in phonograph record-playing mechanisms and more particularly to a spindle adaptor structure for a record changer of the type wherein a plurality of records may be disposed in a stack above the turntable and discharged successively, one at a time onto the turntable.

An important object of the present invention is to provide, for us in a phonograph record changer, an improved spindle structure which is constructed from a minimum number of parts and is economical in cost.

Another object of my invention is to provide an improved spindle adaptor structure for a phonograph record changer of the automatic type, which structure is simplified, extremely durable, and readily manufacturable.

An additional object of the present invention, for a phonograph record changer, an improved 45 r.p.m. spindle adaptor, which is constructed in such a manner that is extremely easy to remove 45 r.p.m. records from the turntable after they have been played, with the adaptor remaining seated thereon.

Still another object of my invention is to provide an improved 45 r.p.m. phonograph spindle adaptor which is efficient in operation and effectively precludes any undue wear of records utilized in conjunction with the adaptor.

In carrying out the present invention, in one form thereof, it is applied to a record changer adapted to support a stack of records above a turntable. For cooperatively positioning and guiding conventional type records having a relatively small central aperture upon the turntable, a conventional elongated record positioning spindle is provided. This spindle has a shoulder thereon for supporting these conventional records above the turntable. An actuating means is movable in the spindle for operating successive records positioned upon the spindle shoulder to playing position on the turntable. With such an arrangement, for enabling the spindle and its actuating means to effectively and readily feed another type of record having a relatively large-sized central aperture (e.g. 45 r.p.m. records) to the turntable, a molded one-piece adaptor element is provided. This adaptor element is removably cooperable with the spindle and has opposed curved walls for cooperatively positioning the records having the relatively large central aperture upon the turntable. A shoulder is formed in one of the walls of the adaptor for supporting this particular type of records. An elongated vertical bore is formed in the adaptor element. This bore opens at one of its ends into the bottom of the element. The other end of the bore opens into the wall of the adaptor element near the adaptor shoulder. The bore of the adaptor element receives and cooperates with the spindle in such a manner that the shoulder of the adaptor is positioned adjacent the shoulder of the spindle and a portion of the movable actuating means of the spindle is operatively exposed. With this arrangement, the adaptor element thus cooperates with the spindle to enable the movable actuating means of the spindle to readily operate records having the relatively large aperture to the turntable from the adaptor element. In view of the fact that the adaptor element represents essentially but a single molded part, the present invention is very simplified and extremely economical to utilize.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following descriptions when taken in conjunction with the accompanying drawings in which:

Figure 3:
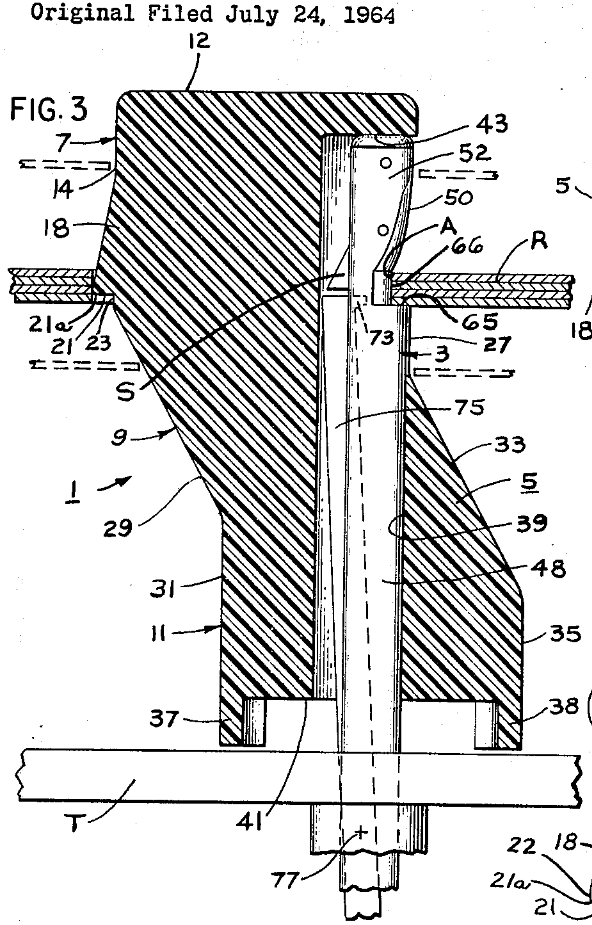
FIG. 3 is a sectional view of the adaptor of FIG. 1 showing the mode of cooperation between this adaptor and one type of conventional spindle, and the mode of operation of stacked records from the adaptor to a turntable.
Figure 1:
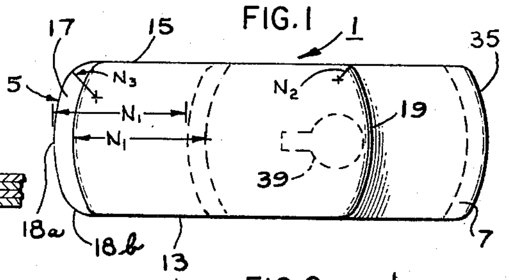
FIG. 1 is a plan view of an improved spindle adaptor for a phonograph record changer, embodying one form of my invention.
Figure 6:
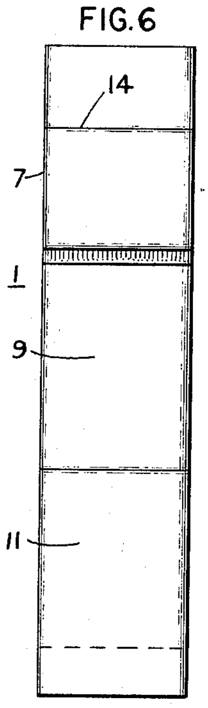
Figures 4, 5, 7:
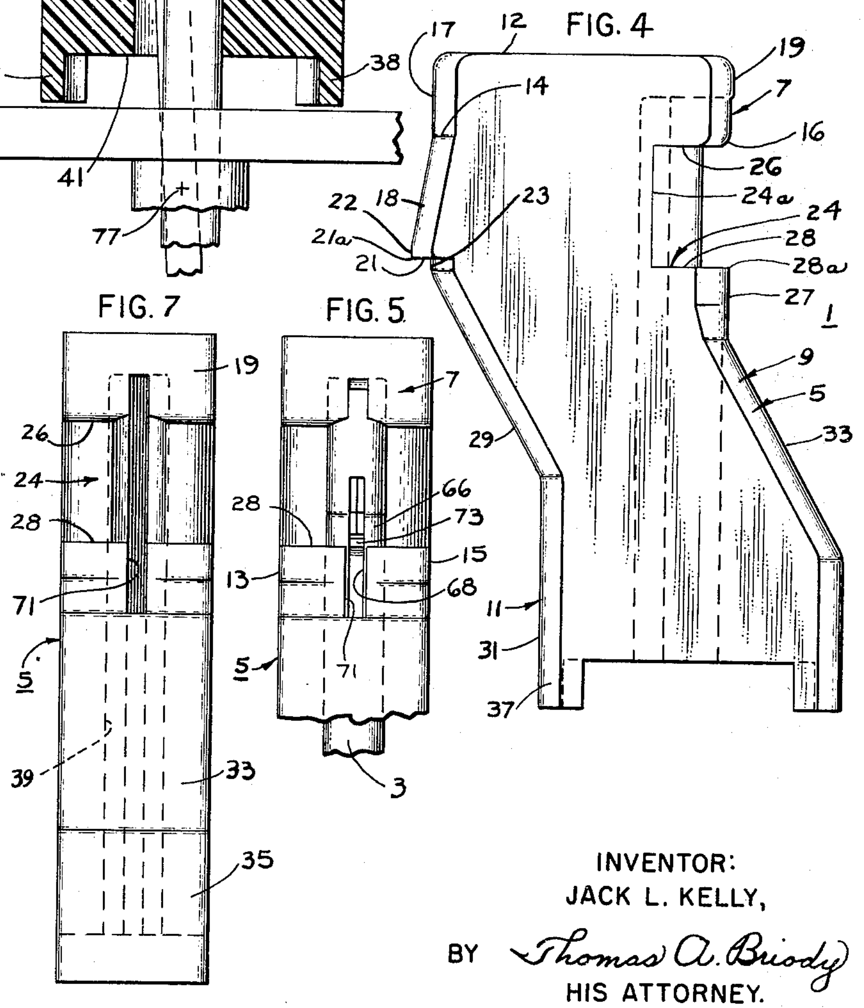
FIG. 4 is a side elevation view of the adaptor of FIG. 1.
Figure 4A:
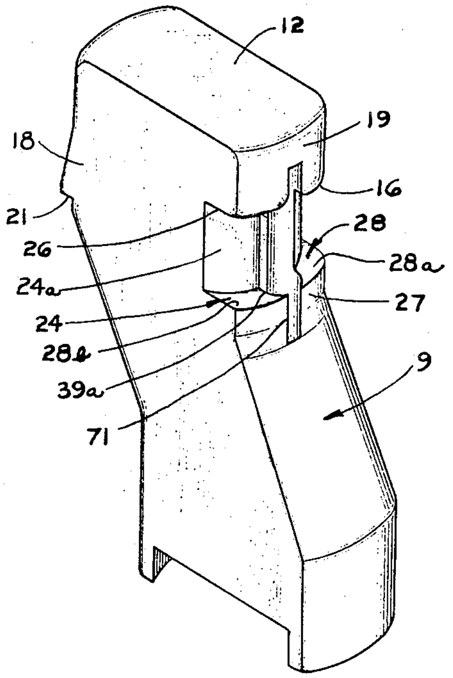
Figure 4B:
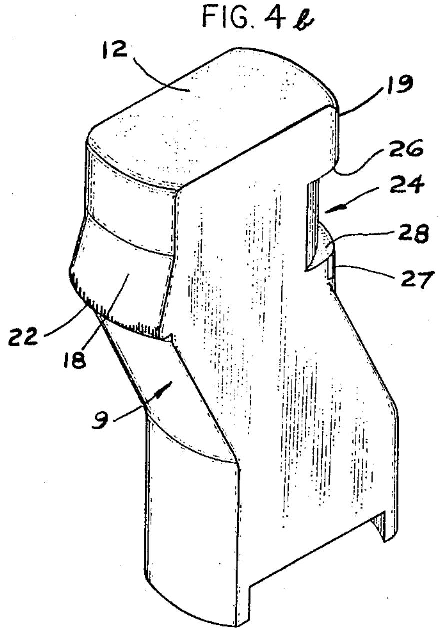
Figures 8, 9, 10, 11, 12, 13, 14:
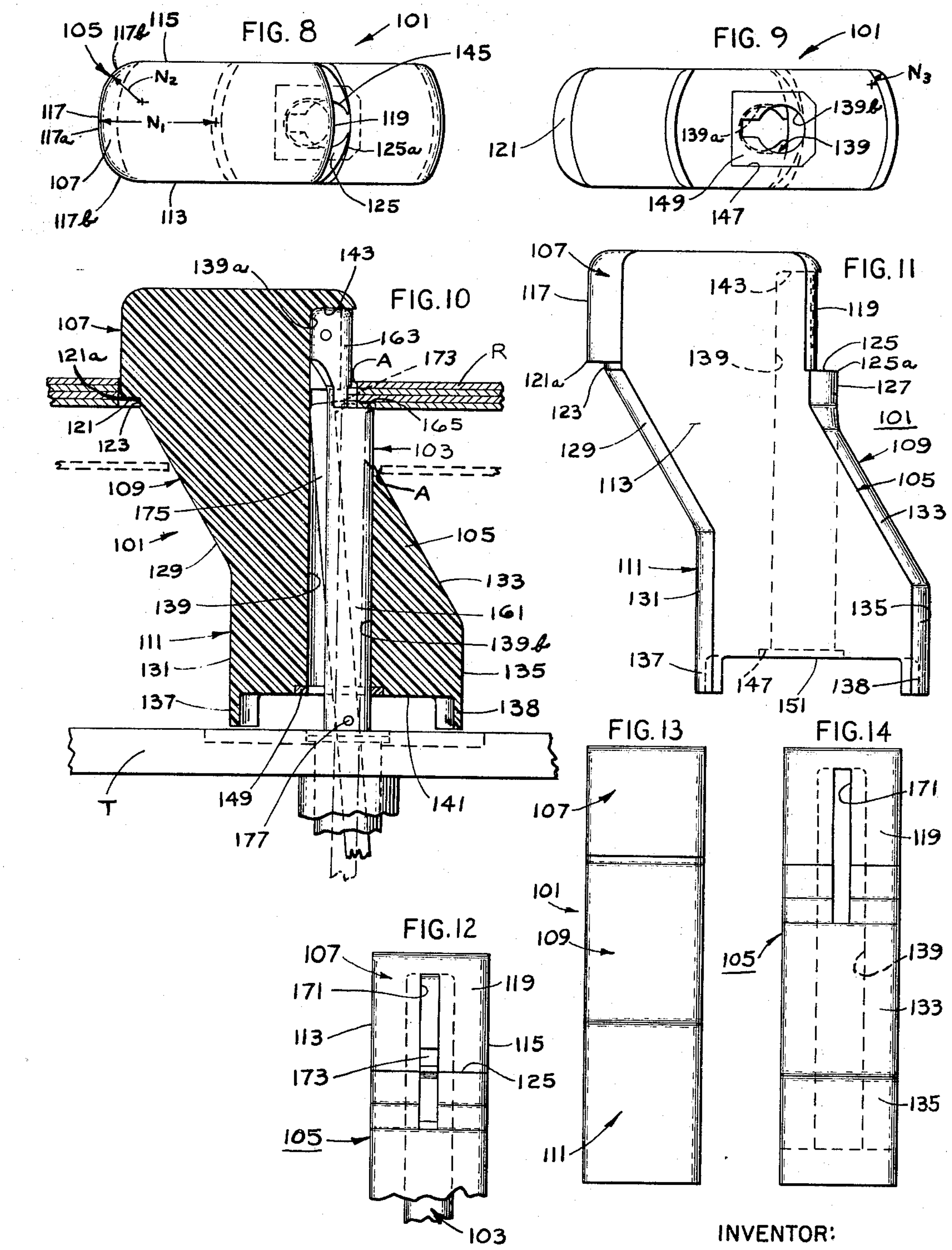

FIG. 4*a* is a frontal perspective view of the adaptor of FIG. 4;

FIG. 4*b* is a rear perspective view of the adaptor of FIG. 4;

FIG. 5 is a fragmentary front view of the adaptor of FIG. 3, showing the way the operating finger of the movable actuating mechanism in the spindle cooperates with the adaptor;

FIG. 6 is a rear view of the adaptor of FIG. 1;

FIG. 7 is a full front view of the adaptor of FIG. 1;

FIG. 8 is a plan view of an adaptor embodying my invention in an alternate form thereof;

FIG. 9 is a bottom view of the adaptor element of FIG. 8;

FIG. 10 is a sectional view of the adaptor of FIG. 8 showing its mode of cooperation with a second form of conventional spindle, and illustrating the mode of operation of stacked records from the adaptor to a turntable;

FIG. 11 is a side elevation view of the adaptor of FIG. 8;

FIG. 12 is a fragmentary front view of the adaptor shown in FIG. 10, for the purpose of illustrating the mode of cooperation between the actuating finger of a movable actuating mechanism of the spindle, and the adaptor;

FIG. 13 is a rear view of the adaptor of FIG. 8; and

FIG. 14 is a full front view of the adaptor of FIG. 8.

Focusing attention first upon one embodiment of my invention, as shown in FIGS. 1–7, a phonograph adaptor unit 1 effectively cooperates with spindle 3 (FIG. 3) to feed stacked records R to the turntable T in successive fashion. The adaptor unit 1 comprises a unitary molded plastic body 5 (as shown in FIG. 4) which essentially includes a record stack receiving section 7, a record feeding cam section 9, and a shank portion 11.

When viewed from the top, as shown in FIG. 1, the stack receiving section 7 of the adaptor body 5 has a generally oblong configuration provided by flat elongated vertical side walls 13, 15, and their coterminous end walls 17, 19. The side walls 13, 15 are in opposed parallel relationship and their uppermost portions are connected at their adjacent vertical ends to adjacent vertical ends of the opposed end walls 17, 19 to form section 7. The end walls 17, 19 are generally of outwardly convex cross-section. From top 12 of the adaptor body 5 to outwardly concave corner 14 (FIG. 4) at the rear end of the adaptor body, and from top 12 of the adaptor body to outwardly convex corner 16 (FIG. 4) at the front end of the adaptor body (FIG. 4), the walls 17 and 19 have a uniform outwardly convex configuration and are arranged in upright fashion (i.e. standing in a vertical direction). For the vertically uniform uppermost portions of the end walls 17, 19, these walls preferably each have a principal radius $N_1$ of slightly less than 0.750 inch (e.g. approximately 0.740 inch), are generally concentric, and may be spaced uniformly apart by approximately 1.480 inches. This enables the top portion of section 7 of the adaptor body 5 to readily and accurately extend through the central apertures of conventional 45 r.p.m. records R (which are 1.504 inches in diameter) for positioning these records above turntable T.

Considering now further the structural configuration of the record stack receiving section 7 of adaptor unit 1, it will be noted that, as shown in FIGS. 3 and 4, between corner 14 of the rear end wall 17 of section 7 and its bottom (at horizontal downwardly facing step 21), there is formed an outwardly convex inclined lip 18 which slopes downwardly and to the left (viewing FIG. 3). The tapered lip 18 slopes downwardly and outwardly at an angle of approximately 72° relative to the horizontal and extends between corner 14 and the horizontal downwardly facing step 21. When viewed from above, (FIG. 1) it will be noted that the tapered lip 18 has a principal radius $N_1$. This particular radius is preferably slightly less than 0.750 inch (e.g. approximately 0.740 inch), and main curved portion 18*a* (FIG. 1) of lip 18 may be connected to vertical side walls 13, 15 by secondary curved portions 18*b*. The secondary curved portions 18*b* each preferably have a radius $N_3$ of substantial magnitude (e.g. 0.250 inch).

Step 21 is connected by a curved corner 21*a* of relatively small radius (e.g. 0.020 inch) to a flat outer tapered surface 22 of lip 18, and step 21 also extends inwardly from the bottom of lip 18 (i.e. from left to right, viewing FIG. 3) to a vertical upper end 23 of the record camming section 9. The step 21 is located at such a vertical elevation as to allow clearance for lateral movement of the lowermost stacked record R (FIG. 3), as shall become apparent hereinafter.

Between corner 16 at the front end wall 19 (FIG. 4) of the adaptor body 5 and the record feeding cam section 9, there is formed in front end wall 19 a horizontal arcuate slot 24 (see also FIGS. 4*a* and 4*b*). The slot 24 is constructed in such a manner that it extends transversely through the front end wall 19 of the adaptor body 5, (as shown in FIG. 4*a*) and provides a pair of opposed substantially arcuate upper and lower horizontal steps 26 and 28 (FIG. 4) which are spaced apart in a vertical direction. Step 28 extends perpendicularly outwardly from a recessed outwardly convex wall 24*a* of the slot 24 to a vertical upper end front portion 27 of the record camming section 9. The step 28 includes right and left portions 28*a* and 28*b* respectively (FIG. 4*a*) which are located at a vertical elevation lower than step 21 by a dimension slightly less than the thickness of a record (e.g. 0.082 inch, such as a 0.045 inch dimension, to allow clearance and sliding support for lateral movement of the lowermost record R, while at the same time precluding any inadvertent droppage of the second record from the bottom of the stack. Contiguous engagement of the flat outermost surface 22 of lip 18 with the second stacked record from the bottom, also contributes to this preclusion of any inadvertent droppage to the turntable.

Turning now to a discussion of the record feeding camming section 9 of adaptor body 5, attention is further directed to FIGS. 3 and 4. As shown therein, the bottom of the vertical upper rear end 23 is connected to an inclined rear wall 29 of uniformly curved outwardly convex configuration. The wall 29 extends downwardly and to the right (viewing FIG. 3), between vertical end 23 of the adaptor and the top of rear wall 31 of the shank portion 11. The inclined convex rear wall 29 of camming section 9 preferably has a principal radius of slightly less than 0.750 inch (e.g. 0.745 inch).

The bottom of upper end front portion 27 of camming section 9 (FIG. 3) is connected to an inclined front wall 33 of uniform outwardly convex configuration. Front wall 33 is inclined relative to the horizontal by approximately the same general angle as convex rear wall 29 (e.g. preferably 60° relative to the horizontal) and extends downwardly to the right (viewing FIG. 3), between vertical front portion 27 of the adaptor and the top of front wall 35 of the shank portion 11. Inclined front wall 33 of section 9 preferably has a principal radius of the same magnitude as wall 29, or slightly less than 0.750 inch (e.g. 0.745 inch).

It will thus be seen that the inclined front wall 33 of the camming section 9 is arranged in generally parallel relationship with inclined rear wall 29 of the camming section. Wall 29 is also approximately the same vertical length as wall 33.

From viewing FIGS. 3 and 4 it will be noted that rear wall 29 is also located, in general, at a higher vertical level than wall 33. The purpose of such an arrangement is to enable the curved slope of front wall 33 to coact with an adjacent portion of the inner edge of the enlarged central aperture A of each actuated lowermost record R for gravitationally camming successive records to turntable T from the record receiving section 7, while the slope of rear wall 29 effectively guides a diametrically opposite inner edge portion of aperture A of each actuated record. Such an overall arrangement facilitates the effective control of 45 r.p.m. records being dropped to the turntable T so that each record R is maintained in a substantially horizontal or level condition during its transition from record positioning section 7 to the turntable T.

For feeding each successive stacked 45 r.p.m. record to the top of the turntable T during the last part of its transit, the adaptor unit 1 includes the shank portion 11, which has a pair of diametrically opposed arcuate flanges 37, 38 depending therefrom. Shank portion 11 also includes the aforementioned outwardly convex rear wall 31 and outwardly convex front wall 35. These walls preferably each may have a principal radius of slightly less than 0.750 inch (e.g. 0.745 inch), are generally concentric, and may be spaced uniformly apart by approximately 1.490 inches. The front side 35 is relatively shorter in vertical height than its opposite rear side 31, and flanges 37, 38 form an integral part of the walls 31 and 35, respectively.

For enabling spindle 3 to effectively cooperate with adaptor unit 1, an elongated vertical bore 39 is formed in the molded plastic body 5. Bore 39 extends vertically upwardly from a recess 41 (FIG. 3) located at the bottom of shank portion 11 between flanges 37 and 38, to a recessed uppermost end 43 (FIG. 3). Bore 39 also perpendicularly traverses upper and lower steps 26 and 28 of the transverse slot 24 of the adaptor body 5.

Figure 2:
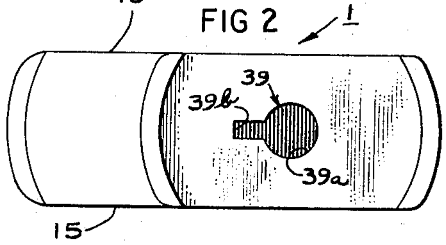
FIG. 2 is a bottom view of the adaptor of FIG. 1.

To enable the bore 39 to receive and cooperate with the spindle 3, it has a substantially uniform cross-sectional configuration which resembles that of a keyhole (FIG. 2). More particularly, the cross-section of bore 39 includes an elongated cylindrical portion 39*a* (FIG. 2) which extends in a vertical direction from recess 41 through uppermost end 43 of the bore, and an elongated rectangular slot portion 39*b* which communicates with the cylindrical portion 39*a*, as shown in FIG. 2. Slot portion 39*b* also extends from recess 41 at the bottom of the adaptor body to its uppermost end 43.

As previously stated, the purpose of forming the bore 39 of the adaptor unit 1, is to enable the adaptor to cooperatively receive the spindle 3. Thus, more particularly, as shown in FIG. 3, spindle 3 includes a substantially cylindrical and elongated body portion 48 with a partially inclined recess 50 formed on one side thereof near its upper end 52 to provide an upwardly facing shoulder 65. At the bottom of recess 50 of spindle 3 there is formed a recessed cylindrical wall 66 (FIG. 3), the bottom of which is coterminous to and perpendicular with shoulder 65. As shown in FIG. 5, an elongated slot 68 is formed on the same side of spindle as recess 50, and this slot 68 divides the shoulder 65 and wall 66 into left and right portions.

The radius of curvature for the cylindrical portion 39*a* of the bore 39 is slightly larger than the radius of curvature for the body portion 48 of the spindle, thereby enabling the body 48 of the spindle to snugly cooperate with the bore 39. The slotted portion 39*b* of the bore 39 facilitates the entry of a pair of sliding record stop members S which are formed in the spindle 3 near its upper end. By means of the cooperation of the sliding members S with the slotted portion 39*b* of the bore 39, the proper orientation of the spindle 3 with respect to the adaptor 1 is thereby achieved. It will also be understood by those skilled in the art that slotted portion 39*b* of bore 39 may cooperate with equivalent advantage with spindles of a similar type having but a single record stop member S.

As further shown by FIGS. 5 and 7 of the drawing, a rectangular slot 71 is formed in the upper vertical wall 27 of the record stack camming portion 9. Slot 71 is effectively formed by the positioning of bore 39 in such a manner that a portion thereof opens into vertical front wall 27 of the adaptor (FIG. 4*a*).

Slot 71 opens at its upper end into the upwardly facing step 28 and also opens laterally outwardly from bore section 39*a* through wall 27. The slot 71 enables an actuating finger 73 of record actuating lever 75 to contact an adjacent inner edge of the central aperture A of the lowermost stacked record R. Thus, more specifically, spindle 3 is of the conventional prior art type utilizing an elongated lever 75 pivoted at 77 within body portion 48 of the spindle. Lever 75 is operated by suitable actuating mechanism (not shown) of a record changer to operate successive records from their stacked position to the turntable T.

Turning now to a detailed explanation of the operation of adaptor unit 1 in combination with spindle 3, attention is directed to FIG. 3. As shown therein, the spindle 3 extends upwardly in upright fashion from turntable T, whereon it may be readily used, as is known by the prior art, for successively sequencing stacked records of the type having relatively small center apertures (e.g. 33⅓ r.p.m. and 78 r.p.m. records) into playing position on the surface of turntable T.

When it is desired to adapt spindle 3 for the accommodation of records having the relatively large central aperture (e.g. the 1.504 inch diameter center aperture of 45 r.p.h. records), the adaptor unit 1 is then pushed downwardly into cooperative engagement with spindle 3 (see FIG. 3). The adaptor unit 1 is angularly oriented with respect to the spindle 3 before engagement of these members into cooperation, by angular alignment of the sliding members S of the spindle 3 with the slotted portion 39*b* of the bore 39.

When the adaptor body 5 is in cooperation with spindle 3, the top 52 of the spindle snugly engages the uppermost end 43 of bore 39. The body portion 48 of the spindle 3 extends upwardly through bore section 39*a* of the adaptor unit 1, and is located on the right side of the bore 39 (viewing FIG. 3). The step 65 of the body portion 48 of the spindle is located at approximately the same vertical level (viewing FIG. 3) as step 28 of the adaptor body (FIG. 4). Step 65 is thus in a vertically flush relationship with step 28. Actuating finger 73 of ejector lever 75 is located in lateral alignment with slot 71 of the front wall of the adaptor body (FIG. 4*a*), adjacent step 28. (See also FIG. 3.)

As further shown in FIG. 3, a stack of four records R having the relatively large central apertures A, are positioned around the record receiving section 7. When the records R shown in FIG. 3 are first placed upon the top of the adaptor unit 1, the apertures A of the records are fitted around the top portion of the record receiving section 7, and records A thereupon move in a uniformly vertical direction until the lowermost record R reaches the position of the upper dotted record shown in FIG. 3. The left edge section of the aperture A of each of the records is then cammed downwardly and to the left by means of the inclined lip 18 so that the records all arrive in the stacked position where they are shown in full in FIG. 3. The records R are thereupon maintained in substantially vertical alignment by means of contiguous association of the right edge sections of their apertures A with recessed vertical wall sections 24*a* (FIG. 4*a*) of the adaptor body and with recessed wall 66 of the spindle. The lowermost record R is then located with its right edge portion (viewing FIG. 3) resting upon step 28 (FIG. 4) of the adaptor unit. In the illustrated embodiment, the right edge portion of the bottom record also rests upon step 65 of the spindle 3. It will also be understood by those skilled in the art that a record stabilizing arm or overarm (not shown) will exert suitable downward forces upon the stacked records R (e.g. to the right of spindle shoulder 65, viewing FIG. 3) so that the records R are maintained in substantially horizontal alignment, the weight of the record stack being principally supported from below by step portions 28*a* and 28*b* (FIG. 4*a*) of the adaptor body 5.

When record ejecting lever 75 is operated by the record changing mechanism, it thereupon moves in a clockwise direction of rotation about its pivot 77 (viewing FIG. 3). Finger 73 of lever 75 then passes through slot 71 (adjacent step 65) and engages the inner edge of aperture A of the lowermost stacked record R to slide this record laterally (i.e. perpendicularly to the longitudinal axis of spindle 3) to the right from its previously aligned position.

When the right edge section of the central aperture A of the lowermost record R reaches the peripheral edge 28*a* (FIG. 4) of step 28, this record then begins to fall downwardly due to the force of gravity. As the right edge section of the central aperture A of the bottom stacked record reaches the bottom of front portion 27 (FIG. 4) of the record camming section 9 (as indicated by the lower dotted record lines in FIG. 3) it is thereupon cammed downwardly and to the right by the inclined front wall 33 of the adaptor camming section 9. Front wall 33 of the adaptor camming section then continues to cam its associated edge of the record, the record being moved downwardly and to the right until the right edge section of the record aperture A reaches the convex vertical front wall 35 of shank portion 11 of the adaptor. The lowermost record is then allowed to move downwardly in vertical fashion to the top surface of turntable T, wherein it is in playing position (i.e. in coaxial alignment with the longitudinal axis of spindle 3).

It is important to note that during movement of a lowermost stacked record R from step 28 of the adaptor to the turntable T, the adaptor unit 1 coacts with the central aperture A of the record R in such a manner that the moving record is maintained in a substantially horizontal position during its entire movement.

When it is desired to remove played records R from turntable T, an important advantage of adaptor unit 1, resides in the fact that two or more records may be readily removed in concurrent fashion from the adaptor unit, while the adaptor unit is still in cooperation with spindle 3. Thus, for removal of a plurality of records from the turntable T, it is merely necessary to grasp the records to be removed at their periphery, and manually reverse the general mode of movement of records toward the turntable from the top of the adaptor. More particularly, records to be removed are pulled upwardly from the turntable T in generally horizontal fashion, until the bottom record that is being removed reaches a vertical position just above step 28 of the adaptor unit. The records are then pivoted slightly in counterclockwise fashion relative to the horizontal and moved laterally to the left (viewing FIG. 3) until the left edges of the record apertures A gently clear the curved bottom section 21*a* (FIGS. 3 and 4) of record receiving section 7. The records are then readily lifted upwardly in vertical fashion from record receiving section 7 for convenient removal from the adaptor unit 1.

It should be noted that when records R are stacked upon shoulder 28 of adaptor unit 1 in the manner illustrated in FIG. 3, the lowermost record is unsupported on the left side thereof (i.e. to the left of lip 18). In view of this, the left side of the lowermost stacked record R inclines downwardly and to the left by a very small angle relative to the horizontal when the records R are in their stacked or "on-deck" condition. As previously mentioned, the vertical distance from step 21 to step 28 of the adaptor unit is preferably approximately 0.045 inch. This distance is less than the thickness of each record R (which may be approximately 0.082 inch) for the express purpose of precluding the possibility of inadvertent concurrent droppage of two or more records in response to the exertion of an actuating force upon the lowermost record R by ejector lever 75.

As mentioned hereinbefore, the adaptor body 5 of unit 1 has a generally oblong configuration provided by the flat vertical side walls 13 and 15 (FIG. 1). The walls 13 and 15 may be beneficially spaced apart uniformly by a dimension of approximately 0.750 inch so that the outwardly convex front walls 19, 33, 35, and the outwardly convex rear walls 17, 29, 31 of the adaptor body 5 have a substantial width (e.g. from left to right viewing FIG. 5). This width is designed to provide effective control of the apertures A of records R during their movement upon and association with adaptor unit 1.

To help facilitate the removal of records R from the turntable T after they have been played, while the adaptor 1 is still in cooperation with spindle 3, and also to enhance the smooth dropping of records to the turntable T, main curved portion 18*a* (FIG. 1) of lip 18 is connected to the vertical side walls 13, 15 by the aforementioned secondary curved portions 18*b*, which preferably each have a substantial radius (e.g. 0.250 inch). In addition, to further enhance the removability of records R from the positioned adaptor and to facilitate its overall efficiency of operation, the convex end walls 19, 29, 33, 31 and 35 may each be beneficially connected to side walls 13, 15 by a radius of curvature $N_2$ of curvature of approximately 0.090 inch (FIG. 1).

It will now be seen that by means of the simplified cooperation of adaptor unit 1 with a conventional spindle 3, the spindle 3 is effectively adapted for operation of records having the enlarged center aperture. It will also be realized that since the adaptor unit 1 totally includes but a single molded part, it is very economical in cost.

Turning now to FIGS. 8–14, there is shown an alternate embodiment of my invention, wherein phonograph adaptor unit 101 (FIG. 11) effectively cooperates with spindle 103 (FIG. 10) to feed stacked records R to the turntable T in successive fashion. The adaptor unit 101 comprises, essentially, a molded plastic body 105 which (as shown in FIG. 11) includes a record receiving section 107, a record camming section 109, and a shank portion 111.

When viewed from the top, as shown in FIG. 8, the record receiving section 107 of the adaptor body 105 has a generally oblong configuration provided by flat vertical side walls 113, 115, and their coterminous end walls 117, 119 of uniform outwardly convex cross-section. The side walls 113, 115 are in opposed parallel relationship and are connected at their adjacent vertical ends to adjacent vertical ends of the opposed end walls 117, 119. The convex end walls 117, 119 preferably each have a principal radius $N_1$ of slightly less than 0.750 inch (e.g. approximately 0.740 inch), are generally concentric, and may be spaced uniformly apart by approximately 1.480 inches. This enables section 107 of the adaptor body 105 to readily and accurately extend through the central apertures of conventional 45 r.p.m. records R (which are approximately 1.504 inches in diameter) for positioning these records above the turntable.

At the bottom of rear end wall 117 (FIG. 11) of the record receiving section 107, there is formed a horizontal downwardly facing step 121. Step 121 is connected by a curved corner 121*a* of relatively small radius to wall 117, and step 121 also extends inwardly from wall 117 (i.e. from left to right, viewing FIG. 10) to a vertical upper end 123 of the record camming section 109. The step 121 is located at such a vertical elevation as to allow clearance for lateral movement of the lowermost stacked record R (FIG. 10), as shall become apparent hereinafter.

At the bottom of front end wall 119 of the record receiving section 107 (FIG. 11), there is formed a horizontal upwardly facing step 125. Step 125 extends outwardly from wall 119 (i.e. from left to right, viewing FIG. 11) to a vertical upper end front portion 127 of the record camming section 109. The step 125 is located at a vertical elevation lower than step 121 by a dimension slightly less than the thickness of a record (e.g. 0.082 inch) to allow clearance and sliding support for lateral movement of the lowermost record R, while at the same time precluding any inadvertent droppage of the second record from the bottom of the stack. In the particular embodiment of my invention illustrated in FIGS. 8–14, the vertical dimension between step 121 and step 125 is approximately 0.045 inch.

Turning now to a discussion of the camming section 109 of adaptor body 105, attention is further directed to FIGS. 10 and 11. As shown therein, the bottom of the vertical upper rear end 123 is connected to an inclined rear wall 129 of uniform outwardly curved configuration. The wall 129 extends downwardly and to the right (viewing FIG. 10) between vertical end 123 of the adaptor and the top of rear wall 131 of the shank portion 111. The inclined convex rear wall 129 of camming section 109 preferably has a principal radius of slightly less than 0.750 inch (e.g. 0.745 inch).

The bottom of upper end front portion 127 of camming section 109 (FIG. 11) is connected to an inclined front wall 133 of uniform outwardly convex configuration. Front wall 133 is inclined relative to the horizontal by approximately the same general angle as convex rear wall 129 (e.g. preferably 60 degrees relative to the horizontal) and extends downwardly and to the right (viewing FIG. 10), between vertical front portion 127 of the adaptor and the top of front wall 135 of the shank portion 111. Inclined front wall 133 of section 109 preferably has a principal radius of the same magnitude as wall 129, or slightly less than 0.750 inch (e.g. 0.745 inch).

It will thus be seen that the inclined front wall 133 of the camming section 109, is arranged in parallel relationship with inclined rear wall 129 of the camming section. Wall 129 is also approximately the same vertical length as wall 133. From viewing FIGS. 10 and 11, it will be noted that rear wall 129 is also located, in general, at a higher vertical level than front wall 133. The purpose of such an arrangement is to enable the slope of front wall 133 to coact with an adjacent portion of the inner edge of the enlarged central aperture A of each actuated lowermost record R for gravitationally camming successive records to turntable T from the record receiving section 107, while the slope of rear wall 129 effectively guides a diametrically opposite inner edge portion of aperture A of each actuated record. Such an overall arrangement facilitates the effective control of 45 r.p.m. records being dropped to the turntable T so that each record R is maintained in a substantially horizontal or level condition during its transition from record positioning section 107 to the turntable T.

For feeding each successive stacked 45 r.p.m. record to the top of turntable T during the last part of its transit, the adaptor unit 101 includes the shank portion 111, which has a pair of diametrically opposed arcuate flanges 137, 138 depending therefrom. Shank portion 111 also includes the aforementioned outwardly convex rear wall 131 and outwardly convex front wall 135. These walls preferably each may have a principal radius of slightly less than 0.750 inch (e.g. 0.745 inch), are generally concentric, and may be spaced uniformly apart by approximately 1,490 inches. The front side 135 is relatively shorter in vertical height than its opposite rear side 131, and flanges 137, 138 form an integral part of the walls 131 and 135, respectively.

For enabling spindle 103 to effectively cooperate with adaptor unit 101, an elongated vertical bore 139 is formed in the molded plastic body 105. Bore 139 extends vertically from a recess 141 (FIG. 10) loacted at the bottom of shank portion 111 between flanges 137, 138, to a recessed uppermost end 143 (FIG. 10). A portion 145 (FIG. 8) of the upper end of the bore 139 also opens upwardly and outwardly from step 125.

At the bottom of bore 139 there is formed adjacent the larger recess 141 of the adaptor body 105, a smaller rectangularly configured recess 147 (FIG. 9). The purpose of recess 147 is to receive and cooperate with a keyway insert 149 (FIG. 9) constructed in such a manner as to help align and position spindle 103 in the bore 139. Between the bottom end 151 (FIG. 11) and portion 145 (FIG. 8) of bore 139, the internal configuration thereof comprises a pair of uniform cylindrical wall sections **139*a* and 139*b* having uniformly parallel and vertical axes which are spaced apart or offset by a small dimension (e.g. 0.125 inch). As shown in FIGS. 9 and 11, between bottom end 151 of the bore 139, and step 125 of the adaptor unit, bore 139 thus comprises, in effect, two overlapping cylindrical bore sections 139*a* and 139*b*. A portion of the bore section 139*b* located on the right side of the bore (viewing FIGS. 9 and 11) opens upwardly into step 125 from bottom 151 to form upper opening 145 (FIG. 8). The remaining part of bore section 139*b* extends upwardly from bottom 151 to the same vertical level as step 125. Bore section 139*a* extends from bottom end 151 of the bore to the recessed uppermost end 143** of the bore.

The purpose of forming bore 139 of the adaptor unit 101 with two overlapping or offset cylindrical bore sections as heretofore described, is to enable the bore 139 to cooperatively receive the spindle 103. Thus, more particularly, as shown in FIG. 10, spindle 103 includes a substantially cylindrical body portion 161 and a substantially cylindrical pilot portion 163 offset from body portion 161 at shoulder 165. The radii of curvature for the bore sections **139*a* and 139*b* are each identical, and are slightly larger than the radii of curvature for body portion 161 and pilot portion 163 of the spindle 103, thereby enabling the upper end of bore section 139*a* to snugly cooperate with pilot portion 163 (FIG. 10) and enabling the bore section 139*b* (FIG. 10) to snugly cooperate with cylindrical body portion 161**.

As further shown by FIGS. 12 and 14 of the drawing, a rectangular slot 171 is formed in the upper front wall of adaptor body 105. Slot 171 has an oblong configuration with its long axis in a vertical direction, and it opens laterally outwardly in a frontal direction from the upper end portion of bore section **139*b*. The slot 171 also traverses the step 125 of the adaptor body 105 (as shown in FIG. 12). Slot 171 enables an actuating finger 173 of record actuating lever 175 to contact an adjacent inner edge of the central aperture A of the lowermost stacked record R. Thus, more specifically, spindle 103 is of the conventional prior art type utilizing an elongated lever 175 pivoted at 177 within body portion 161 of the spindle. Lever 175** is operated by suitable actuating mechanism (not shown) of a record changer to operate successive records from their stacked position to the turntable T.

Turning now to a detailed explanation of the operation of adaptor unit 101 in combination with spindle 103, attention is directed to FIG. 10. As shown therein, the the spindle 103 extends upwardly in upright fashion from turntable T, wherein it may be readily used, as is known by the prior art, for successively sequencing stacked records of the type having relatively small center apertures (e.g. 33⅓ r.p.m. and 78 r.p.m records) into playing position on the surface of turntable T.

When it is desired to adapt spindle 103 for the accommodation of records having the relatively large central aperture (e.g. the 1.504 inch diameter center aperture of 45 r.p.m. records), the adaptor unit 101 is then pushed downwardly into cooperative engagement with spindle 103 (see FIG. 10). The insert 149 (FIG. 9) is secured into recess 147 in flush fashion at the bottom of adaptor unit 101 to guide or key the entry of spindle 103 with the desired angular orientation relative to bore 139 of body 105 (i.e. as shown in FIG. 10).

When the adaptor body 105 is in cooperation with spindle 103, the top of pilot portion 163 of the spindle snugly engages the uppermost end 143 of bore 139, and pilot portion 163 of the spindle is ensconced and located in the upper end of bore section **139*a*. The body portion 161 of the spindle 103 extends upwardly through bore section 139*b* of the adaptor unit 101, and is located on the right side of bore 139 (viewing FIG. 10). The step 165 of body portion 161 of the spindle is located at approximately the same vertical level (viewing FIG. 10) as step 125 of the adaptor body. Actuating finger 173 of ejector lever 175 is located in lateral alignment with slot 171 of the front wall of the adaptor body (FIG. 14) and adjacent step 125** (see also FIG. 10).

As further shown in FIG. 10, a stack of four records R having the relatively large central apertures A, are positioned around the record receiving section 107. The outwardly convex front wall 119 and the outwardly convex rear wall 117 of the adaptor section 107 cooperate with the central apertures A of the records R to maintain these records in coaxial vertical alignment, substantially as shown in FIG. 10. The lowermost record R is then located with its right edge portion (viewing FIG. 10) resting upon step 125 (FIG. 11) of the adaptor unit. In the illustrated embodiment, the right edge portion of the bottom record also rests upon step 165 of the spindle. It will also be understood by those skilled in the art that a record stabilizing arm of overarm (not shown) will exert suitable downward forces upon the stacked records R (e.g. to the right of spindle shoulder 165, FIG. 10) so that the records R are maintained in substantially horizontal alignment, the weight of the record stack being principally supported from below by step 125 of the adaptor body 105.

When record ejecting lever 175 is operated by the the record changing mechanism, it thereupon moves in a clockwise direction of rotation about its pivot 177 (viewing FIG. 10). Finger 173 of lever 175 then passes through slot 171, engages the inner edge of aperture A of the lowermost stacked record R and slides this record laterally (i.e. perpendicularly to the longitudinal axis of spindle 103) to the right from its previously aligned position. When the right edge section of the central aperture A of the lowermost record R reaches the peripheral edge 125*a* (FIG. 11) of step 125, this record then begins to fall downwardly due to the force of gravity.

As the right edge section of the central aperture A of the bottom stacked record reaches the bottom of front portion 127 (FIG. 11) of the record camming section 109 (as indicated by the dotted record lines in FIG. 10) it is thereupon cammed downwardly and to the right by the inclined front wall 133 of the adaptor camming section 109. Front wall 133 of the adaptor camming section then continues to cam its associated edge of the record, the record being moved downwardly and to the right until the right edge section of the record aperture A reaches the convex vertical front wall 135 of shank portion 111 of the adaptor. The lowermost record is then allowed to move downwardly in vertical fashion to the top surface of turntable T, wherein it is in playing position (i.e. in coaxial alignment with the longitudinal axis of spindle 103).

It is important to note that during movement of a lowermost stacked record R from step 125 to the turntable, the adaptor unit 101 coacts with the central aperture A of the record R in such a manner that the moving record is maintained in a substantially horizontal position during its entire movement.

When it is desired to remove played records R from turntable T, an important advantage of adaptor unit 101, resides in the fact that two or more records may be readily removed in concurrent fashion from the adaptor unit, while the adaptor unit is still in cooperation with spindle 103. Thus, for removal of a plurality of records R from the turntable, it is merely necessary to grasp the records to be removed at their periphery, and manually reverse the general mode of movement of records toward the turntable from the top of the adaptor. More particularly, records to be removed are pulled upwardly from the turntable T in generally horizontal fashion, until the bottom record that is being removed reaches a vertical position just above step 125 of the adaptor unit. The records are then pivoted slightly in a counterclockwise fashion relative to the horizontal and moved laterally to the left (viewing FIG. 10) until the left edges of the record apertures A gently clear the curved bottom section 121*a*, (FIGS. 10 and 11) of record receiving section 107. The records are then readily lifted upwardly in vertical fashion from the record receiving section 107 for convenient removal from the adaptor unit 101.

It should be noted that when records R are stacked upon shoulder 125 of adaptor unit 101 in the manner illustrated in FIG. 10, the lowermost record is unsupported on the left side thereof (i.e. to the left of rear wall 117). In view of this, the left side of the lowermost record R inclines downwardly and to the left by a very small angle relative to the horizontal when the records R are in their stacked or "on-deck" condition. As previously mentioned, the vertical distance from step 121 to step 125 of the adaptor unit 101 is preferably approximately 0.045 inch. This distance is less than the thickness of each record R (which may be approximately 0.082 inch) for the express purpose of precluding the possibility of inadvertent concurrent droppage of two or more records in response to the exertion of an actuating force upon the lowermost record R by ejector lever 175.

As mentioned hereinbefore, the adaptor body 105 of unit 101 has a generally oblong configuration provided by the flat vertical side walls 113 and 115 (FIG. 8). The walls 113 and 115 may be beneficially spaced apart uniformly by a dimension of approximately 0.750 inch so that the outwardly convex front walls 119, 133, 135, and the outwardly convex rear walls 117, 129, 131 of the adaptor body 105 have a substantial width (e.g. from left to right viewing FIG. 13). This width (FIG. 13) is designed to provide effective control of the apertures A of records R during their movement upon and association with adaptor unit 101.

To help facilitate the removal of records R from the turntable T after they have been played, while the adaptor 101 is still in cooperation with spindle 103 and also to enhance the smooth dropping of records to the turntable T, main curved portion 117*a* (FIG. 8) of rear wall 117 of record receiving section 107 is connected to the vertical side walls 113, 115 by secondary curved portions 117*b*. These secondary curved portions 117*b*, preferably, each have a radius of curvature $N_2$ of substantial magnitude (e.g. approximately 0.250 inch) to enhance the removability of the records R upwardly through the left side of record receiving section 107 (viewing FIG. 10) of the adaptor, from turntable T. Such a radius $N_2$ also enhances the smooth dropping of records R. In addition, to further enhance the removability of records R from turntable T, while adaptor 101 is in engagement with spindle 103, and to facilitate the overall efficiency of adaptor 101, the convex end walls 119, 129, 133, 131 and 135 may each be beneficially connected to side walls 113, 115 by a radius $N_3$ of curvature of approximately 0.090 inch (FIG. 9).

It will thus be seen that by means of the present invention I have provided for use in phonograph record changers, improved spindle adaptor structure involving a minimum number of parts. It will also be understood that adaptor units embodying my invention are efficient in operation, readily manufacturable, and economical in cost. It will also be realized that my improved adaptors preclude any undesirable wear to records.

While in accordance with the patent statutes, I have described what at present are considered to be the preferred embodiments of my invention, it will be obvious to those skilled in the art that various changes and modifications may be made therein without departing from this invention.

What I claim as new and desire to secure by Letters Patent of the United States is:

1. In a record changer adapted to support a stack of records above a turntable, an elongated record positioning spindle for cooperatively positioning records having a relatively small internal diameter upon said turntable, said spindle having a means thereon for supporting said records above said turntable, means movable in said spindle for actuating successive records positioned on said supporting means to playing position on said turntable, and a one piece molded adaptor element removably cooperable with said spindle for facilitating the controlled movement of a stack of records having a relatively large internal diameter onto said turntable, said adaptor element comprising a record receiving section located at its top, a record positioning section located at its bottom, and an intermediate camming section for allowing records to move in a controlled fashion from said record receiving section to said record positioning section, said record receiving section having a front wall and a rear wall, said rear wall having an upper termination and a lower termination, a bore formed in said adaptor element for placement of the adaptor element on said spindle, one end of said bore opening into the bottom of said element thereby to receive said spindle, said bore also opening at a vertical level spaced upwardly from said one end into a front wall of said element so that the supporting means of said spindle is exposed from said adaptor by means of said bore, the vertical distance between said supporting means and the lower termination of said rear wall of said record receiving section being of sufficient magnitude to allow lateral movement of a record resting on the supporting means, but being of less magnitude than the thickness of a record to hold all but the lowermost record of the record stack against lateral movement upon actuation of said record actuating means, whereby the one-piece adaptor element cooperates with said spindle to economically control the movement to the turntable of a stack of records having large internal diameters, while expressly precluding the possibility of inadvertent concurrent droppage of two or more said records onto said turntable.

2. In a record changer adapted to support a stack of records above a turntable, an elongated record positioning spindle for cooperatively positioning records having a relatively small internal diameter upon said turntable, said spindle having a shoulder thereon for supporting said records above said turntable, record ejector means movable in said spindle for actuating successive records positioned on said shoulder to playing position on said turntable, and a one-piece molded adaptor element removably cooperable with said spindle for facilitating the controlled movement of a stack of records having a relatively large internal diameter onto said turntable, said element having an axially directed passage running substantially the length thereof for placement of the adaptor element on said spindle, an upwardly facing step formed in a front wall of said element for helping to support a stack of records thereon, said passage of said element communicating with the front wall of said element adjacent said step so that said record ejector means is operably exposed adjacent said step, and a downwardly facing step formed in the rear wall of said body to help preclude droppage of the second record from the bottom of said stack onto said turntable, the distance between said upwardly facing step and said downwardly facing step being of sufficient magnitude to allow lateral movement of a record resting on the upwardly facing step of said adaptor, but being of less magnitude than the thickness of a record to hold all but the lowermost record of the record stack against lateral movement upon actuation of said record ejector means, whereby the one-piece adaptor element cooperates with said spindle to economically control the movement to the turntable of a stack of records having large internal diameters, while expressly precluding the possibility of inadvertent concurrent droppage of two or more said records onto said turntable.

3. The record changer of claim 2 wherein said element comprises a record receiving section located at its top, a record positioning section located at its bottom, and an intermediate camming section for allowing records to move in a controlled fashion from said record receiving section to said record positioning section, said record receiving section including a wall portion offset from an adjacent associated wall portion of said intermediate camming section thereby to provide the upwardly facing step for helping to support a stack of records thereon.

4. The record changer of claim 3 wherein the offset wall portion of said receiving section is in substantially perpendicular relationship to the upwardly facing step thereby to provide clearance for removal of a plurality of played records from the turntable while the adaptor element is in cooperative engagement with said spindle.

5. The record changer of claim 3, wherein there is a means including a tapered lip formed in said record receiving section for camming records into supported position on said upwardly facing step of said adaptor element.

6. The record changer of claim 3 wherein the front and rear walls of the record receiving section are arranged so that they extend perpendicularly to the turntable when the adaptor element is positioned upon the spindle, and the front and rear walls of the camming section are inclined between said record receiving section and said record positioning section at an angle of approximately 60 degrees relative to the horizontal.

7. A spindle adaptor for use with a phonograph record changer having a rotatable turntable and a stationary spindle for records having center holes of relatively small diameter, said spindle having a shoulder located between its upper and lower ends for supporting said records above said turntable, and a record ejector means movable in said spindle adjacent said shoulder for actuating successive records positioned on said shoulder to playing position on said turntable, said adaptor comprising a one-piece molded element removably cooperable with said spindle, said element comprising a record receiving section located at its top, a record positioning section located at its bottom, and an intermediate camming section located therebetween, said record receiving section having a front wall and a rear wall at least the latter wall of which includes an upper termination and a lower termination, a bore formed in said adaptor element for placement of the adaptor element on said spindle, one end of said bore opening into the bottom of said element thereby to receive said spindle, said bore also opening at a vertical level spaced upwardly from said one end into a front wall of said element so that when said adaptor is placed on said spindle the shoulder of said spindle is exposed from said adaptor by means of said bore for supporting records having center holes of relatively large diameter, the vertical distance between said spindle shoulder and the lower termination of the rear wall of said record receiving section being of sufficient magnitude to allow movement of a record resting on the shoulder of the spindle, but being of less magnitude than the thickness of a record to hold all but the lowermost record of the record stack against lateral movement upon actuation of said record ejector means, whereby the one-piece adaptor element is capable of cooperating with said spindle to economically control the movement to the turntable of a stack of records having center holes of relatively large diameter, while expressly precluding the possibility of inadvertent concurrent droppage of two or more of said records onto said turntable.

References Cited

UNITED STATES PATENTS

| | | |
|---|---|---|
| 2,884,255 | 4/1959 | Wennerbo et al. |
| 3,191,941 | 6/1965 | Krahulec. |
| 3,191,942 | 6/1965 | Tatter. |
| 3,245,689 | 4/1966 | Tatter et al. |

NORTON ANSHER, Primary Examiner

J. F. PETERS, JR., Assistant Examiner